United States Patent
Handshaw et al.

(10) Patent No.: US 9,798,911 B1
(45) Date of Patent: *Oct. 24, 2017

(54) IMAGING MODULE AND READER FOR, AND METHOD OF, READING A TARGET BY IMAGE CAPTURE THROUGH A WINDOW IN DIRECT, SEALED CONTACT WITH THE MODULE

(71) Applicant: SYMBOL TECHNOLOGIES, LLC, Lincolnshire, IL (US)

(72) Inventors: Darran M. Handshaw, Sound Beach, NY (US); Edward D. Barkan, Miller Place, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,260

(22) Filed: Apr. 8, 2016

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01); *G06K 2207/1011* (2013.01)

(58) Field of Classification Search
CPC .. G06K 7/10; G06K 9/24; G06K 5/00; G06K 7/01; G02B 26/08; G02B 5/08; G02B 26/00; G03B 7/08
USPC .............. 235/462.21, 462.22, 462.11, 462.2, 235/462.24, 462.35, 462.43
See application file for complete search history.

(56) References Cited

U.S. PATENT DOCUMENTS

| | | | |
|---|---|---|---|
| 6,612,493 B1 | 9/2003 | DeGiovine et al. | |
| 8,770,485 B1* | 7/2014 | Liou | G06K 7/10732 235/454 |
| 9,185,306 B1 | 11/2015 | Tan et al. | |
| 9,378,402 B2 | 6/2016 | Duan et al. | |
| 2006/0131419 A1 | 6/2006 | Nunnink | |
| 2009/0272808 A1 | 11/2009 | Drzymala et al. | |
| 2009/0321614 A1* | 12/2009 | Drzymala | G06K 7/10732 250/208.1 |
| 2010/0012726 A1 | 1/2010 | Tsi Shi et al. | |
| 2012/0049049 A1 | 3/2012 | Vinogradov et al. | |
| 2012/0126015 A1* | 5/2012 | Wittenberg | G06K 7/10881 235/462.41 |
| 2015/0021396 A1 | 1/2015 | Nunnink | |

OTHER PUBLICATIONS

U.S. Appl. No. 15/075,388, filed Mar. 21, 2016.

(Continued)

Primary Examiner — Edwyn LaBaze
(74) Attorney, Agent, or Firm — Yuri Astvatsaturov (57) ABSTRACT

A light-transmissive window is positioned in direct, sealing contact with a chassis of an imaging module for reading a target by image capture. The chassis has a plurality of interior compartments, each having an opening. An imager, an aiming light source, and an illuminating light source are mounted on a common printed circuit board and individually contained in the compartments. The window covers each opening and environmentally seals, optically isolates, and resists entry of the light from the aiming and/or illuminating light sources into, the interior compartment.

19 Claims, 11 Drawing Sheets

(56) References Cited

OTHER PUBLICATIONS

International Search Report and Written Opinion for International Patent Application No. PCT/US2017/019678 dated May 19, 2017.
International Search Report and Written Opinion for International Patent Application No. PCT/US2017/022508 dated Jul. 19, 2017.

* cited by examiner

IMAGING MODULE AND READER FOR, AND METHOD OF, READING A TARGET BY IMAGE CAPTURE THROUGH A WINDOW IN DIRECT, SEALED CONTACT WITH THE MODULE

BACKGROUND OF THE INVENTION

The present disclosure relates generally to an imaging module and an imaging reader for, and a method of, reading a target, such as a bar code symbol, to be electro-optically read by image capture over a field of view through a window that is positioned in direct, sealed contact with the module, and, more particularly, to preventing light from aiming and/or illuminating and/or indicating and/or object sensing systems onboard the module from interfering with a successful reading of the target.

Solid-state imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes a housing having a window, and an imaging module, also known as a scan engine, mounted in the hosing at a spacing from the window. The module has a chassis with a plurality of interior compartments. An aiming light system, which has an aiming light source contained in one of the compartments, directs one or more visible aiming lights through the window to a target to visually locate the target and, thus, advise an operator which way the reader is to be pointed in order to position the aiming lights on the target, prior to reading. An illuminating system, which has an illuminating light source contained in another of the compartments, emits one or more illuminating lights through the window toward the target to illuminate the target, especially in dimly lit environments. An imaging system, which has a solid-state imager contained in still another of the compartments, captures an image of the target through the window over a field of view. An indicating system, which has an indicating light source supported on the chassis, emits an indicating light that visually indicates when the target has been successfully read. An object sensing system, which has a wakeup light source supported on the chassis, emits an object sensing light at the target to detect the entry of the target into the field of view. These systems are generally located in close proximity with one another on the chassis, especially when a small-sized chassis is desired for a particular reader.

Although generally satisfactory for their intended purpose, the close mutual proximity of these systems could cause the aiming and/or illuminating and/or indicating and/or object sensing lights to stray and leak into the compartment containing the imager, and such cross-talk could interfere with a successful imaging and reading of the target. This leakage is exacerbated by the spaced-apart window, which could rearwardly reflect, for example, the aiming and/or illuminating lights back to the imaging system in the chassis. In addition, the aiming and/or illuminating and/or object sensing lights could stray and leak to the indicating system and erroneously indicate that a target has been successfully read. Furthermore, dust, moisture, dirt, and like contaminants could migrate not only among the systems and interfere with their performance, but also could be deposited on the spaced-apart window. Reflections of the aiming and/or illuminating and/or object sensing lights from such contaminants on the window could create bright spots in the captured image and further degrade reading performance.

Accordingly, it would be desirable to environmentally seal, optically isolate, and resist entry of stray aiming and/or illuminating and/or indicating and/or object sensing light into, the compartment containing the imager, to mitigate stray internal reflections, and to improve overall reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The imaging module, the imaging reader, and the method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module is operative for reading a target, e.g., a bar code symbol, by image capture. The module includes a chassis having chassis walls bounding an interior compartment having an opening. A light source for emitting light is supported by the module. An imaging system has an imager, e.g., a charge coupled device (CCD) array or a complementary metal oxide semiconductor (CMOS) array of cells or sensors, which is contained in the interior compartment, for capturing an image of the target through the opening over a field of view. A light-transmissive window is positioned in direct contact with the chassis and covers the opening. The window environmentally seals, optically isolates, and resists entry of the emitted light into, the interior compartment.

Advantageously, the light source may be an aiming light source for directing the emitted light as an aiming light at the target, or may be an illuminating light source for directing an illuminating light at the target, or may be an indicating light source for directing the emitted light as a visual indicating light when the target has been successfully read, or may be an object sensing light source for directing the emitted light as an object sensing light at the target to detect the entry of the target into the field of view. The aiming light source and the illuminating light source are preferably respectively mounted in other interior compartments of the chassis, and are mounted, together with the imager, on a common, generally planar, printed circuit board (PCB). The chassis walls of all the interior compartments extend away from the PCB in a direction generally perpendicular to the PCB and terminate in outer wall surfaces. The window is in direct, sealed contact with the outer wall surfaces. Preferably, the window is generally planar, is fixedly mounted on the chassis, and is positioned to be generally parallel to the PCB.

In accordance with another feature of this disclosure, the aforementioned imaging module is mounted in the interior of a housing of an imaging reader. The housing is preferably embodied as a portable, point-of-transaction, gun-shaped, handheld housing, but could be embodied as a handheld, box-shaped housing, or any other configuration including a hands-free configuration. The window not only environmentally seals the interior compartments of the module as described above, but also environmentally seals the interior of the housing, for example, against dirt, moisture, dust, and like contaminants.

In accordance with still another feature of this disclosure, a method of reading a target by image capture is performed by configuring a chassis with chassis walls bounding an interior compartment having an opening, by emitting light from a light source supported by the chassis, by capturing an image of the target through the opening over a field of view, and by environmentally sealing, optically isolating, and resisting entry of the emitted light into, the interior compartment by positioning a light-transmissive window in direct contact with the chassis and in a covering relationship with the opening.

By so positioning the window in direct, sealed contact with the outer wall surfaces of the chassis walls, stray aiming and/or illuminating and/or indicating and/or object sensing lights are prevented from leaking into the compartment containing the imager, and stray aiming and/or illuminating and/or object sensing lights are prevented from leaking to the indicating system. Furthermore, dust, moisture, dirt, and like contaminants are prevented from migrating among the systems, and from depositing on the window. Reading performance is enhanced.

Figure 1:
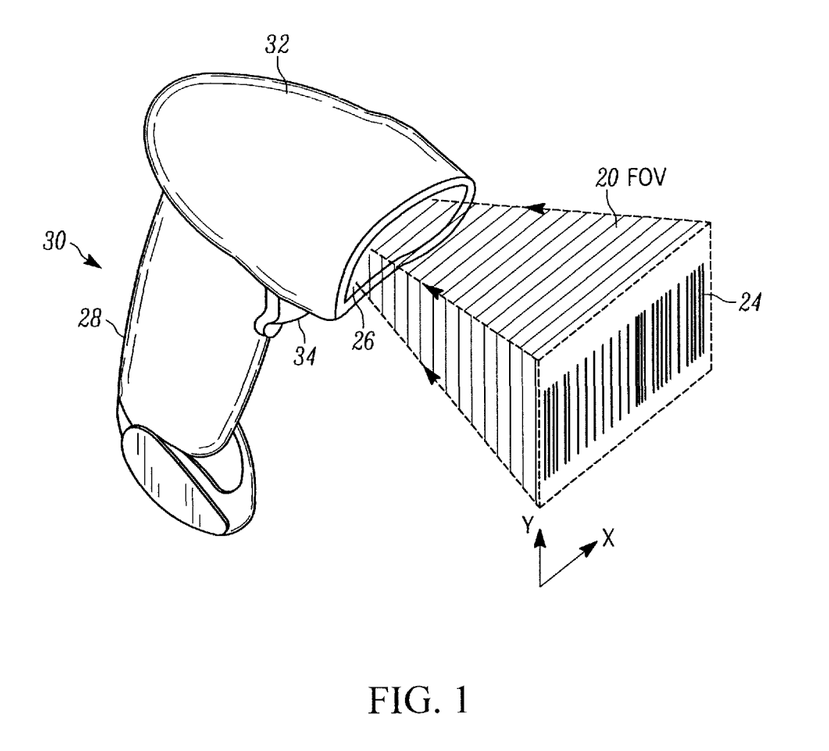
FIG. 1 is a perspective view of an exemplary embodiment of an electro-optical handheld reader for reading targets by image capture through a window that is positioned in direct, sealed contact with an imaging module within the reader in accordance with this disclosure.

Turning now to the drawings, reference numeral 30 in FIG. 1 generally identifies a handheld imaging reader for electro-optically reading targets 24, such as bar code symbols or like indicia, over an angular field of view (FOV) 20.

The reader 30 includes a housing 32 in which an imaging or scan engine or imaging module 40, as described in detail below in connection with FIGS. 2-8, is mounted. The housing 32 includes a generally elongated handle or lower handgrip portion 28 and a barrel or upper body portion having a front end at which a light-transmissive window 26 is located. The cross-sectional dimensions and overall size of the handle 28 are such that the reader 30 can conveniently be held in an operator's hand. The body and handle portions may be constructed of a lightweight, resilient, shock-resistant, self-supporting material, such as a synthetic plastic material. The plastic housing 32 may be injection molded, but can also be vacuum-formed or blow-molded to form a thin hollow shell which bounds an interior space whose volume is sufficient to contain the various components of this reader 30. A manually actuatable trigger 34 is mounted in a moving relationship on the handle 28 in a forward facing region of the reader 30. An operator's forefinger is used to actuate the reader 30 to initiate reading by depressing the trigger 34. Although the housing 32 is illustrated as a portable, point-of-transaction, gun-shaped, handheld housing, this is merely exemplary, because the housing could also be embodied as a handheld, box-shaped housing, or with any other configuration including a hands-free configuration.

Figure 2:
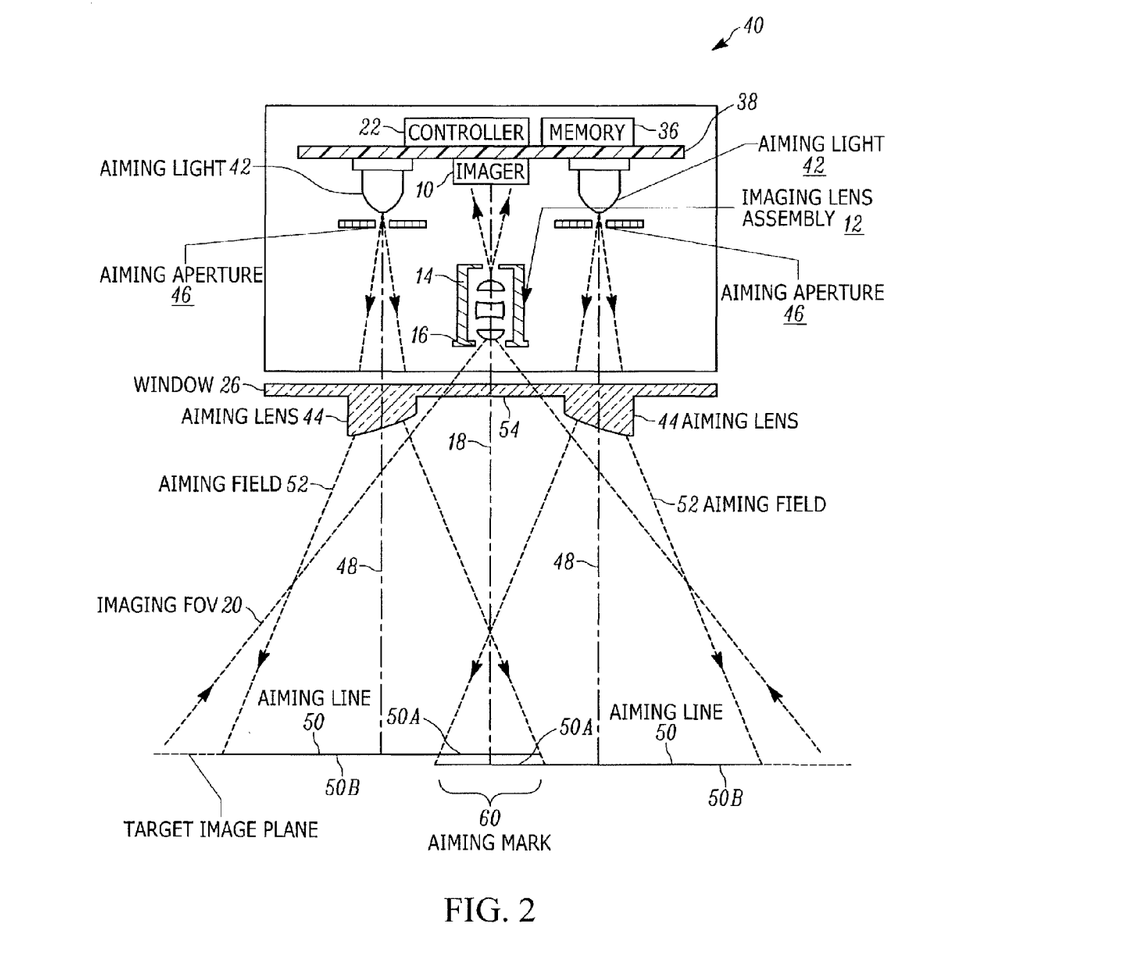
FIG. 2 is a diagrammatic view of components of imaging and aiming systems onboard the imaging module within the reader of FIG. 1.

As diagrammatically shown in FIG. 2, the imaging module 40 includes an imaging system having a solid-state imager 10, and an imaging lens assembly 12 mounted in a tubular holder 14 that has a circular aperture 16. The imager 10 is a two-dimensional, charge coupled device (CCD) array or a complementary metal oxide semiconductor (CMOS) array of cells or sensors having either a global or a rolling shutter. For low cost reasons, a CMOS imager may be advantageously used with a rolling shutter. The imager 10 and imaging lens 12 are preferably aligned along a centerline or an optical imaging axis 18 generally centrally located within the upper body portion of the housing 32.

In operation, the imaging system captures return light passing through an upper central zone 54 of the window 26 along the imaging axis 18 centered in the imaging field of view 20 of the imaging lens assembly 12 from the target 24 located in a range of working distances away from the window 26. The imager 10 is advantageously positioned closer to a rear wall of the upper body portion than to a front of the housing 32 in order to enlarge the imaging field of view 20 in the near range of working distances close to the reader 30. The imaging lens assembly 12 preferably comprises one or more fixed-focus lenses, preferably a Cooke triplet, having an imaging plane at which the target 24 is best focused and imaged onto the imager 10. The field of view 20 is generally rectangular and extends along the illustrated mutually orthogonal, horizontal X-axis and vertical Y-axis (see FIG. 1) that are both generally perpendicular to the imaging axis 18. The sensors produce electrical signals corresponding to a two-dimensional array of pixel information for an image of the target 24. The electrical signals are processed by a controller or programmed microprocessor 22 into data indicative of the target 24 being read. The controller 22 is connected to a memory 36 for data retrieval and storage. The controller 22 and the memory 36 may be mounted on a printed circuit board (PCB) 38, which is supported by the module 40, as described below.

The imaging system is capable of acquiring a full image of the target 24 under various lighting conditions. An illuminating system, as described below, may also be mounted on the module 40 to provide illuminating light to illuminate the target. Exposure time is controlled by the controller 22. Resolution of the array can be of various sizes although a VGA resolution of 640×480 pixels may be used to minimize cost.

An aiming system, including one or more aiming light assemblies, is supported on the module 40, and is offset from the imaging system. The aiming system is operative for projecting on the target 24 an aiming mark 60 (see FIG. 2). The aiming light assemblies are spaced apart along the horizontal X-axis at opposite sides of the imaging sensor 10. Each aiming light assembly includes an aiming light source or emitter, e.g., a light emitting diode (LED) 42, mounted on the PCB 38; a generally linear aiming aperture 46 that extends along the horizontal X-axis in front of the respective LED 42; and a toroidal aiming lens 44 mounted away from its respective LED 42 and, as more fully described below, is integrated with the window 26. Each aiming LED 42, aiming lens 44 and aiming aperture 46 are centered and lie along a respective aiming axis 48. The aiming axes 48 generally lie in a common plane and are generally parallel to one another. As shown, the aiming LEDs 42 and the sensor 10 are mounted along a common horizontal axis, but this need not be the case, since the aiming LEDs 42 can be mounted either above or below the imager 10. Advantageously, the imaging axis 18 lies in the same plane and is generally parallel to the aiming axes 48.

The aiming light assemblies are operative for directing the aiming light emitted from each aiming LED 42 through the respective aperture 46 and the respective aiming lens 44 along the respective aiming axis 48 over an angular aiming field 52 that is centered on the respective aiming axis 48 at the target 24. On the target 24, these aiming fields 52 describe a pair of aiming light lines 50, each having a predetermined brightness. The aiming light lines 50 are collinear along the horizontal X-axis. The aiming light lines 50 have inner linear end regions 50A that extend past the imaging axis 18 and that overlap on the target 24 to form a bright, linear, aiming mark 60 having a brightness greater than the predetermined brightness due to the superposition of the inner linear end regions 50A to visually indicate a center area of the field of view 20 over the range of working distances. Thus, the operator can position the aiming mark 60 on the target 24, and the target 24 will be substantially centered in the imaging field of view 20. The aiming light lines 50 also have outer linear end regions 50B that extend along the horizontal X-axis toward, and that visually indicate, approximate boundary zones or end limits of the field of view 20 over the range of working distances. Thus, the operator is guided to position the outer linear end regions 50B on the target 24, such that the target 24 will be substantially contained entirely within the imaging field of view 20.

As best seen in FIGS. 5-9, the aiming lenses 44 are formed of one-piece construction with the window 26 at opposite sides of, and away from, the upper central zone 54 through which the image of the target 24 is captured. The window 26 may be constituted of glass and/or molded plastic materials, and the integrated optical system includes one or more optical elements, e.g., aiming lenses 44, which may likewise be constituted of glass and/or molded plastic materials. Thus, the window 26 may be made of glass and each aiming lens 44 may be made of the same glass. Alternatively, the window 26 may be made of plastic and each aiming lens 44 may be made of the same plastic. In other variations, the window 26 may be made of glass and each aiming lens 44 may be made of plastic that is deposited or molded onto the glass in a process known as overmolding or replication, or vice versa, in which the window 26 may be made of plastic and each aiming lens 44 may be made of glass that is molded into the plastic. Although the aiming lenses 44 are shown on the outer surface of the window 26, they can also be formed on the inner surface of the window 26. Thus, the aiming lenses 44 are integral with the window 26, thereby reducing the total number of components to be individually fabricated, installed and aligned.

Figure 3:
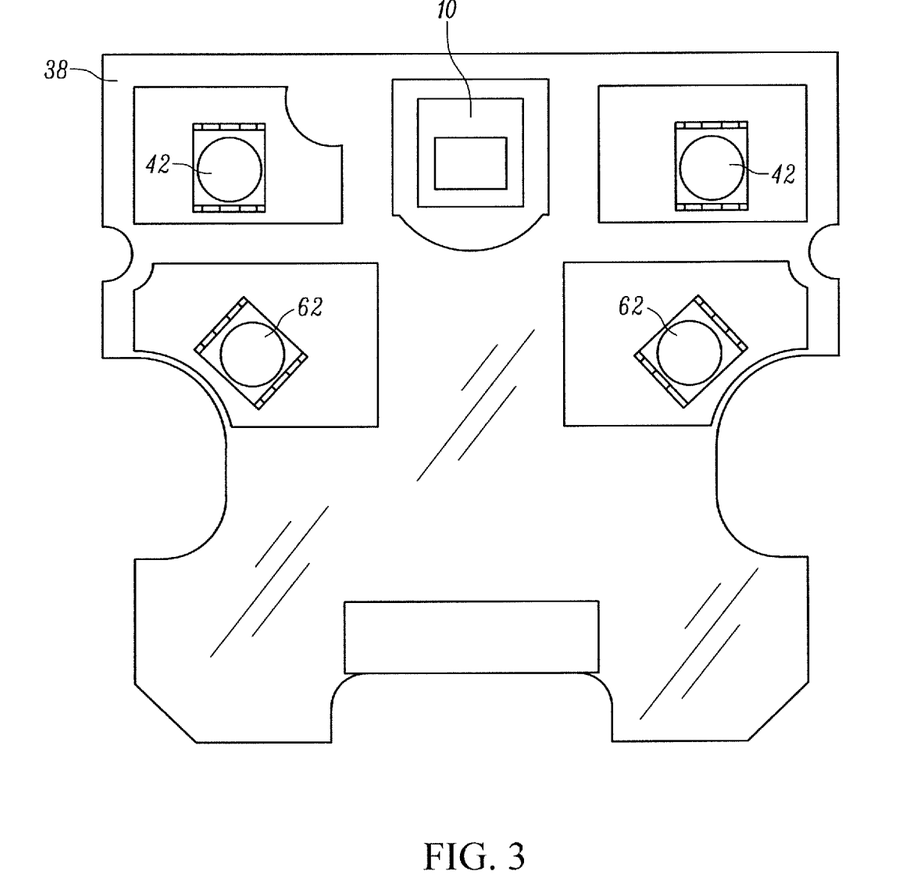
FIG. 3 is an enlarged, front view of components of imaging, aiming, and illuminating systems on a printed circuit board to be supported by the imaging module.
Figure 4:
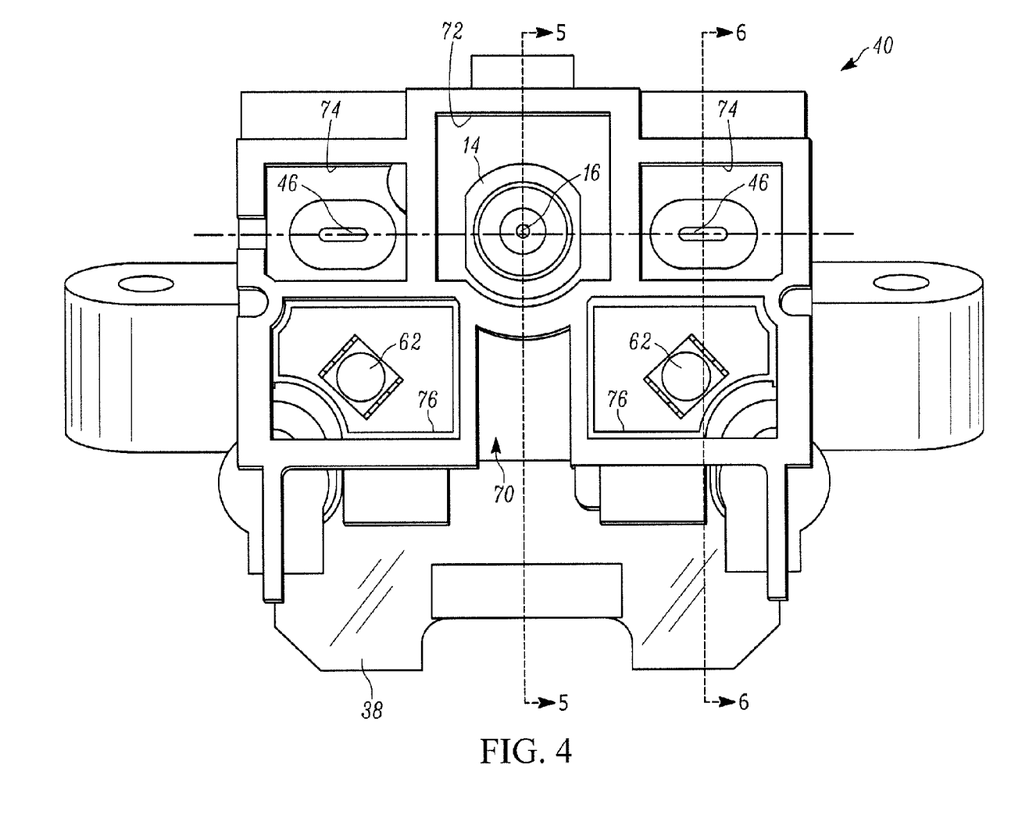
FIG. 4 is an enlarged, front view of a chassis positioned on the printed circuit board of FIG. 3.
Figure 5:
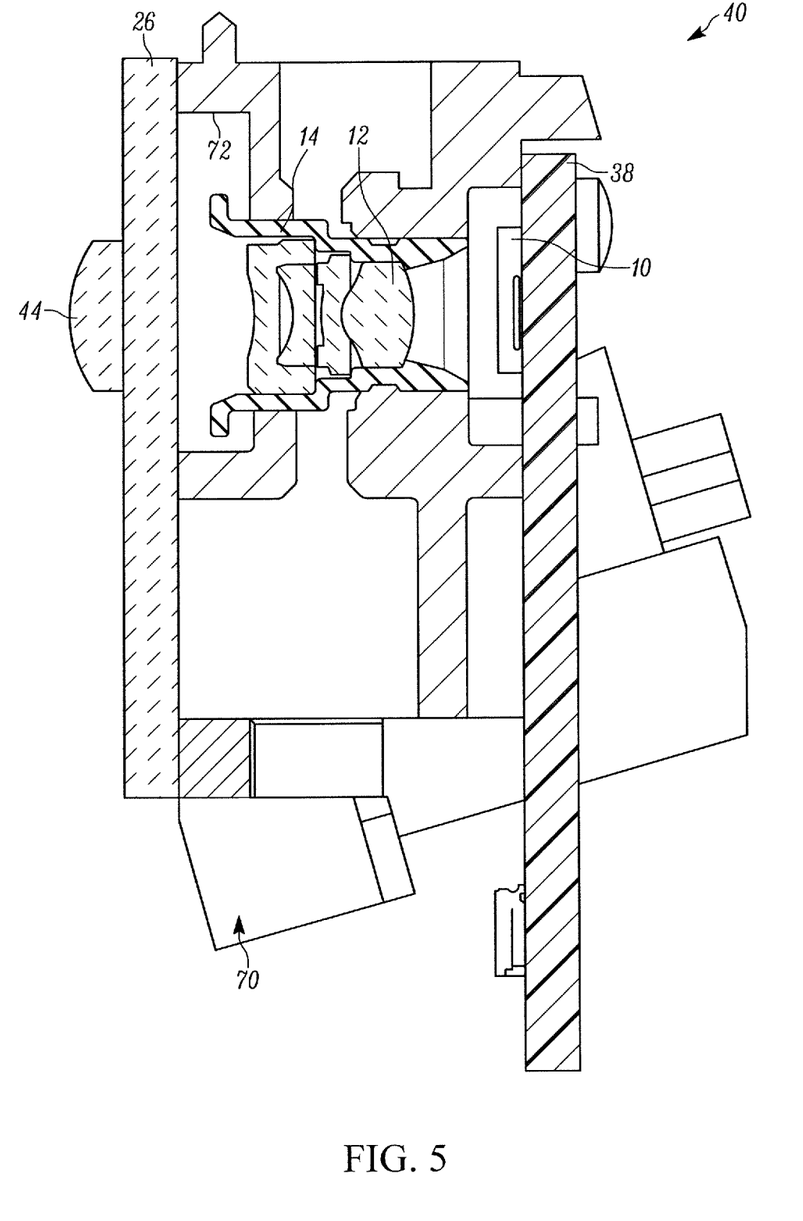
FIG. 5 is a sectional view taken on line 5-5 of FIG. 3.
Figure 6:
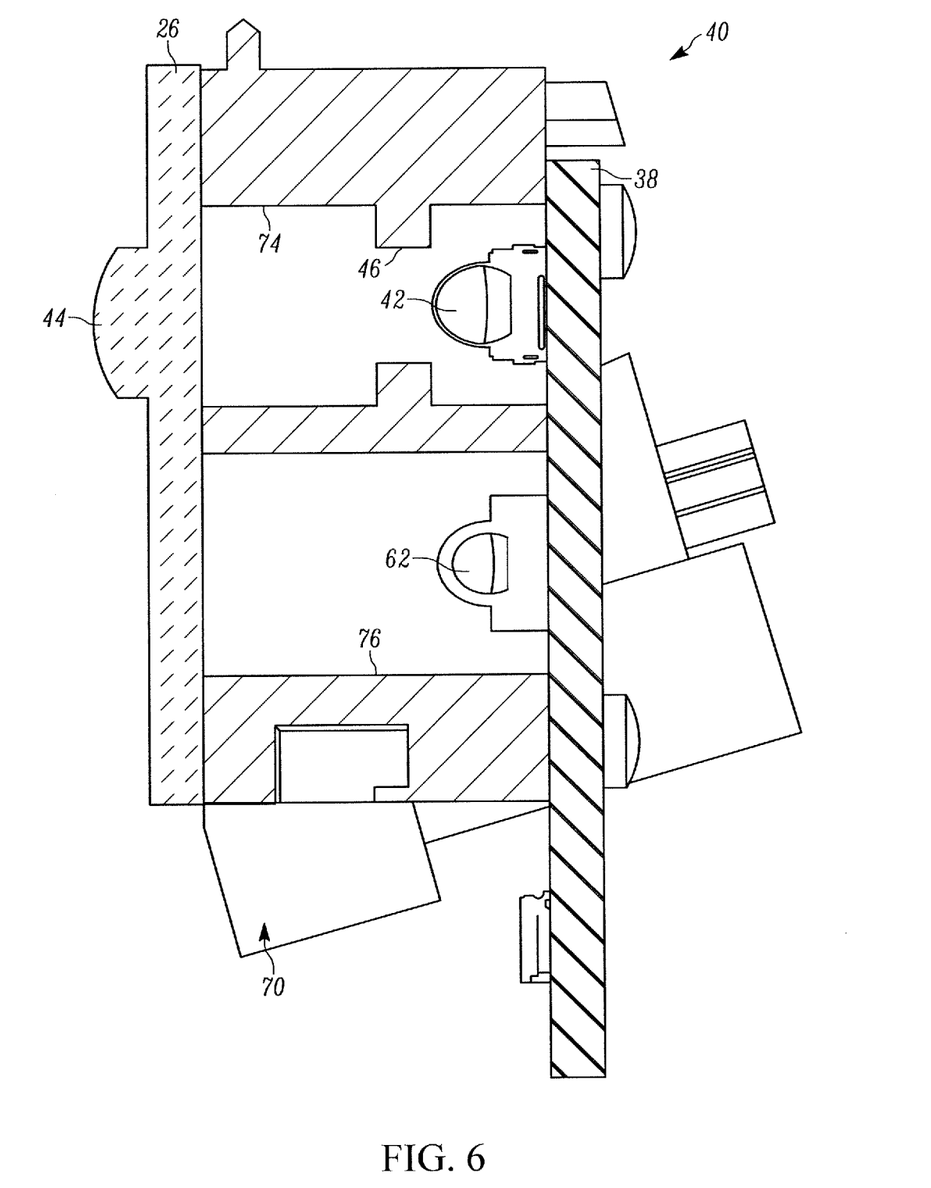
FIG. 6 is a sectional view taken on line 6-6 of FIG. 3.

As shown in FIGS. 3-4, 6, and 11-12, the reader 30 may also include an illuminating light system, e.g., one or more illuminating light sources or emitters, such as light emitting diodes (LEDs) 62, mounted on the PCB 38. As best shown in FIG. 3, the aiming light sources 42, the illuminating light sources 62, and the imager 10 are all surface-mounted on the same PCB 38. In a variant construction, the illuminating light sources 62 could be mounted on a separate PCB that preferably is coplanar with the PCB 38. Each illuminating LED 62 is operative for illuminating the target 24 by emitting illuminating light over an illumination angle centered on an illumination axis 64 toward the target 24 for reflection and scattering therefrom. Each illuminating LED 62 is advantageously provided with an optical element, such as a compound parabolic reflector (CPR) 66 to uniformly and efficiently illuminate the target 24 with an illuminating light pattern. Each CPR 66 is preferably integrated with the window 26 and is configured to receive, and to optically modify, the illuminating light emitted from each illuminating LED 62 to generate a generally uniform and efficient illumination light pattern, preferably of generally rectangular shape, that is substantially congruent to, and substantially overlaps, the field of view 20, again preferably of generally rectangular shape, along both the X- and Y-axes depicted in FIG. 1. Each CPR 66 has a first pair of parabolic segments that are located at opposite sides of the illumination axis 64 for reflecting the emitted illuminating light over a first illumination angle along the X-axis, and a second pair of parabolic segments that are also located at opposite sides of the illuminating axis 64 for reflecting the emitted illuminating light over a second illumination angle along the Y-axis. Each CPR 66 is advantageously a solid element, e.g., a molded plastic, whose interior surfaces reflect and guide the illuminating light away from each illuminating LED 62 with total internal reflection. Each CPR 66 could also be a hollow element.

Figure 10:
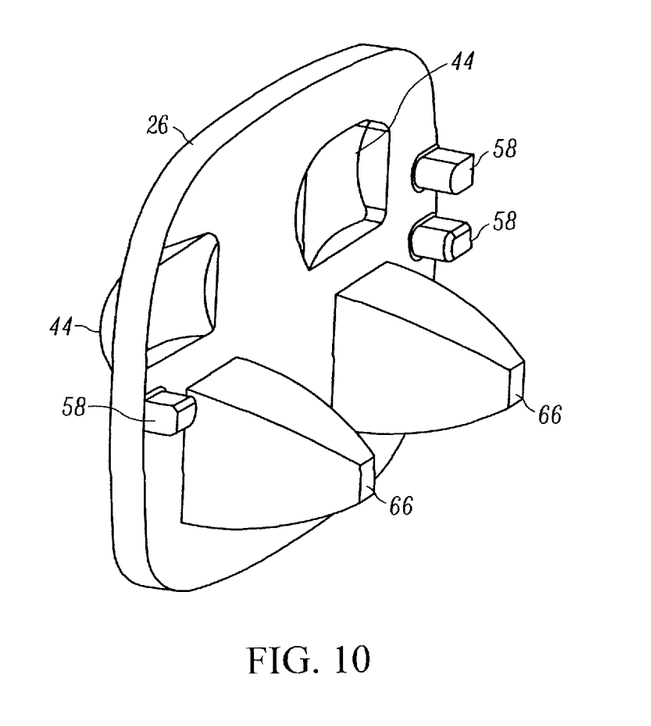
FIG. 10 is a rear, perspective view of another embodiment of the window in isolation.
Figure 11:
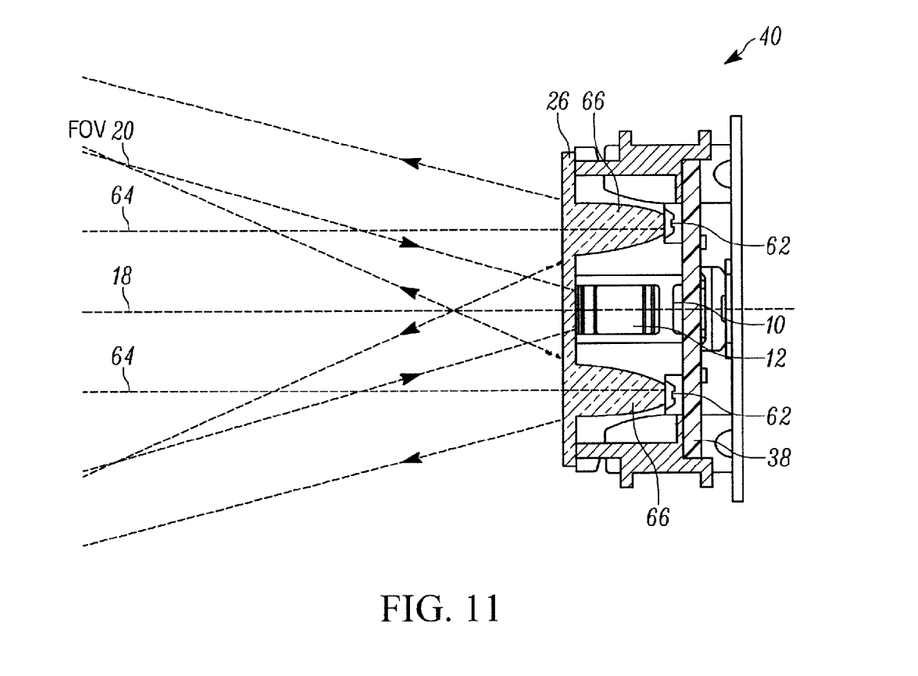
FIG. 11 is a top, sectional view of components of the imaging and illuminating systems of the reader of FIG. 1.
Figure 12:
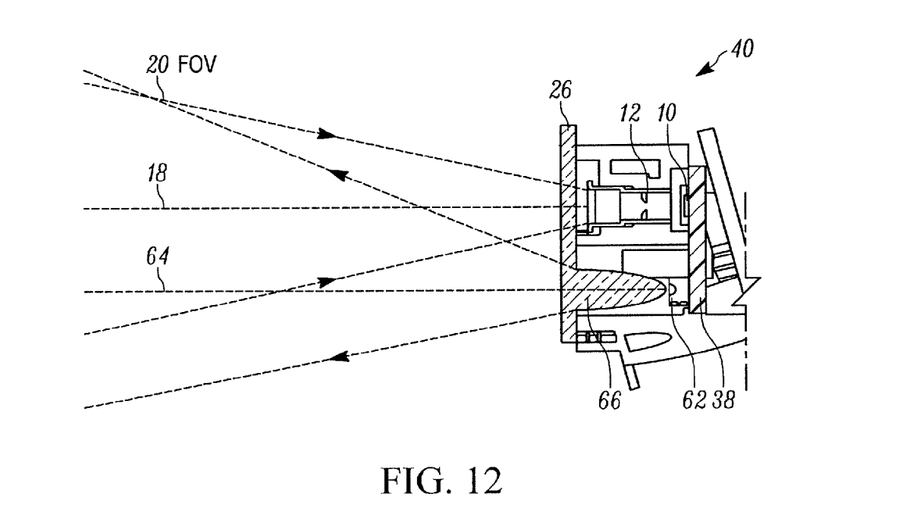
FIG. 12 is a side, sectional view of components of the imaging and illuminating systems of FIG. 7.

As best seen in FIG. 10, the CPRs 66 are formed of one-piece construction with the window 26 at opposite sides of, and below, the upper central zone 54 through which the image of the target 24 is captured. The window 26 may be constituted of glass and/or molded plastic materials, and the integrated optical system includes one or more optical elements, e.g., the CPRs 66, that may likewise be constituted of glass and/or molded plastic materials. Thus, the window 26 may be made of glass and each CPR 66 may be made of the same glass. Alternatively, the window 26 may be made of plastic and each CPR 66 may be made of the same plastic. In other variations, the window 26 may be made of glass and each CPR 66 may be made of plastic that is deposited or molded onto the glass in a process known as overmolding or replication, or vice versa, in which the window 26 may be made of plastic and each CPR 66 may be made of glass that is molded into the plastic. Although the CPRs 66 are shown on the inner surface of the window 26, they can also be formed on the outer surface of the window 26. Thus, the CPRs 66 are integral with the window 26, thereby reducing the total number of components to be individually fabricated, installed and aligned.

Figure 7:
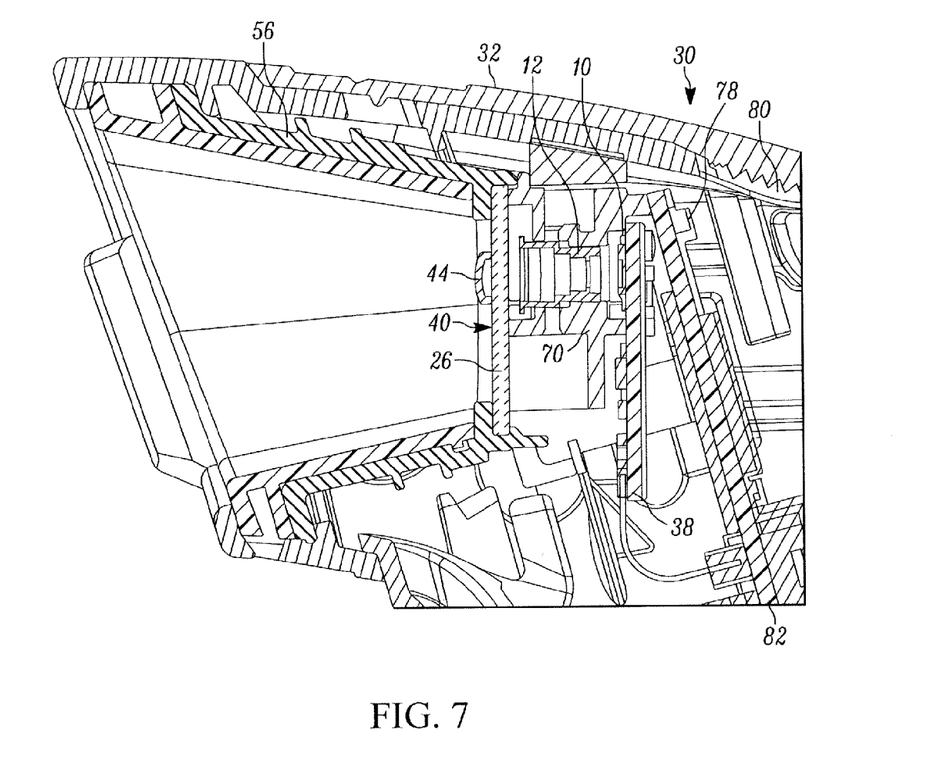
FIG. 7 is a broken-away, sectional view depicting the imaging module mounted in the reader of FIG. 1.
Figure 8:
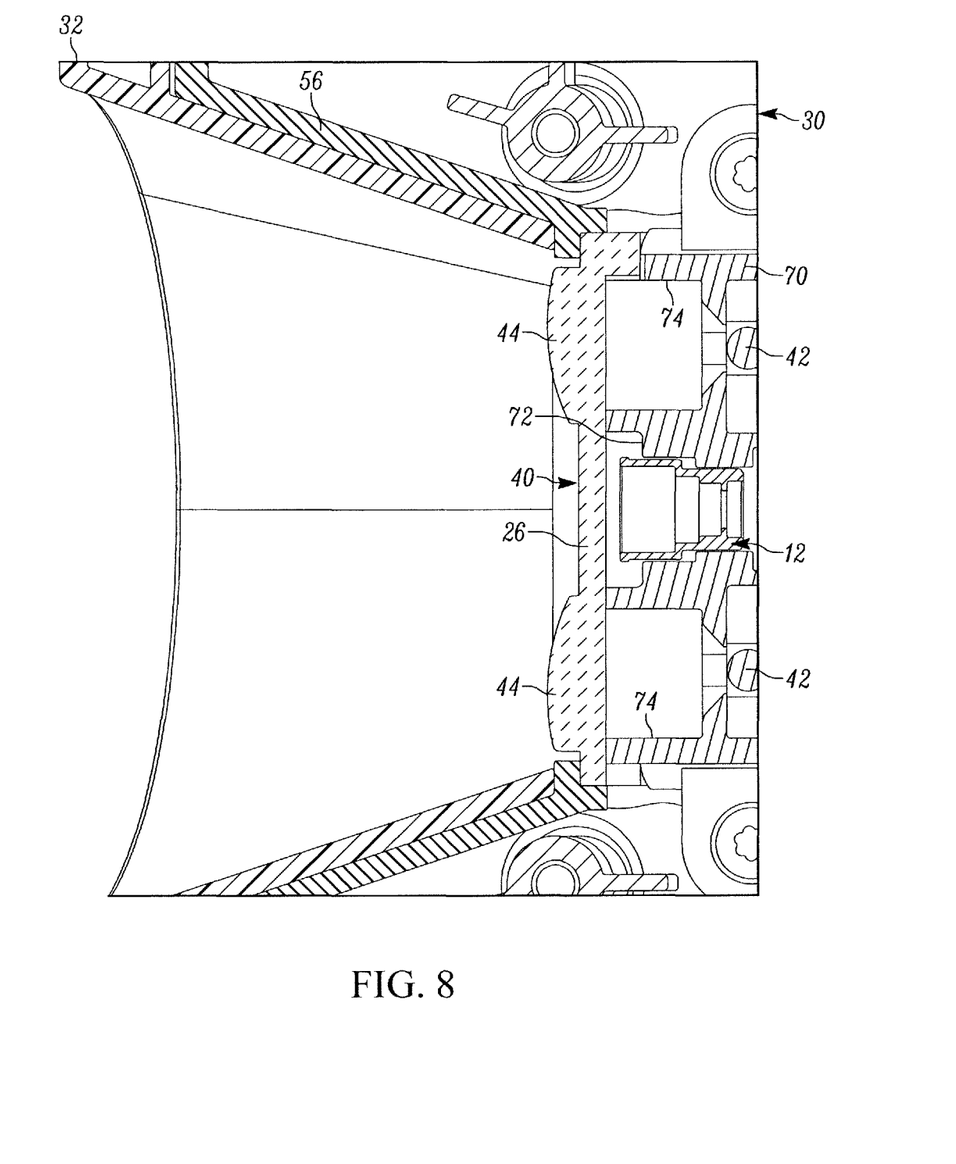
FIG. 8 is a broken-away, top sectional view depicting the imaging module mounted in the reader of FIG. 1.
Figure 9:
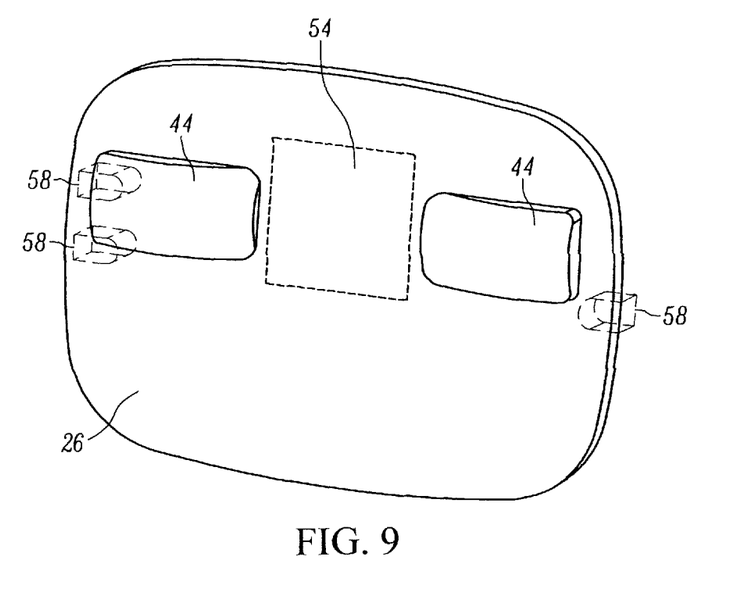
FIG. 9 is a front, perspective view of the window in isolation in accordance with one embodiment.
Figure 13:
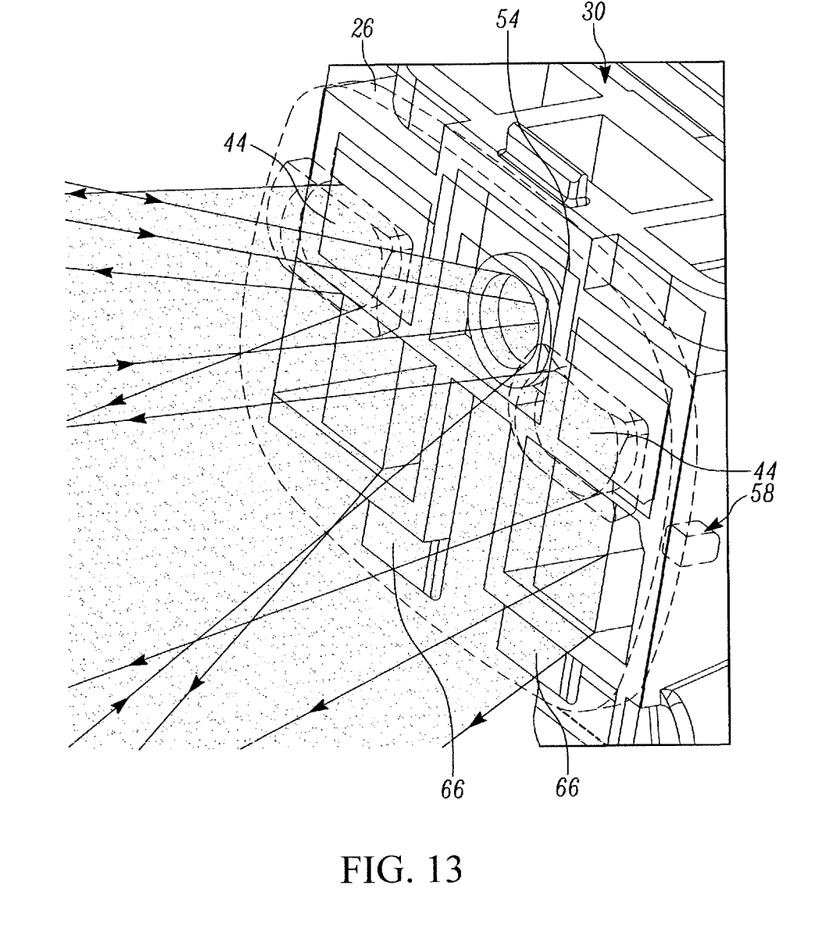
FIG. 13 is an enlarged, broken-away, perspective view depicting the aiming lights and the illuminating lights exiting the window, as well as the field of view of the imager entering the window, of the reader of FIG. 1.

As best seen in FIGS. 7-8, the window 26 environmentally seals the interior of the housing 32, for example, against dirt, moisture, dust, and like contaminants. A rubber gasket or seal 56 helps to seal the window 26 in its position at the front of the reader 30. As best shown in FIGS. 9-10, a plurality of locating pins 58 are integrally formed with the window 26 to assist in mounting the window 26 in its sealed position, and to prevent rotation of the window 26. One such pin 58 is provided at one side of the window 26, and a pair of such pins 58 is provided at the opposite side of the window 26. The locating pins 58 assist in locating the window 26 accurately with respect to the aiming, imaging, and illuminating systems. More particularly, the optical elements on the window 26 are accurately located relative to the aiming lenses 44, the aiming apertures 46, the aiming LEDs 42, the CPRs 66, and the illuminating LEDS 62. FIG. 13 depicts the aiming lights and the illuminating lights exiting the accurately located window 26, as well as the field of view of the imager 10 entering the accurately located window 26.

As best shown in FIGS. 4-8, the module 40 includes a chassis 70 having chassis walls bounding a plurality of interior compartments 72, 74, and 76, each having an opening. The imager 10 and the imaging lens assembly 12 are contained in the compartment 72. The aiming light sources 42 and the aiming light apertures 46 are respectively contained in a pair of the compartments 74. The illuminating light sources 62 are respectively contained in a pair of the compartments 76. The imager 10, the aiming light sources 42, and the illuminating light sources 62 are all mounted on the same PCB 38, which is supported at a back wall of the chassis in a generally upright position. The chassis walls of all the interior compartments 72, 74, and 76 extend forwardly away from the PCB 38 in a direction generally perpendicular to the PCB 38 and terminate in outer wall surfaces at each opening.

In accordance with this disclosure, the window 26 is not spaced away from the chassis 70, but instead, is positioned in direct, sealed contact with the chassis 70 and, more particularly, the window 26 directly engages the outer wall surfaces of the chassis 70 and covers each opening of each compartment 72, 74, and 76. The chassis walls extend sufficiently forwardly to create physical barriers among the compartments 72, 74, and 76 to optically isolate them from one another, and the covering window 26 thus environmentally seals, optically isolates, and resists entry of any stray aiming and/or illuminating light into, the interior compartment 72 in which the imager 10 is contained.

An indicating light source 78 (see FIG. 7) is also supported on the module 40, preferably rearwardly of the chassis 70 and mounted on another PCB 82. In a variant construction, the indicating light source 78 could be mounted in its own interior compartment in the chassis 70. The indicating light source 78 emits a visual indicating light to a light scattering section 80 of the housing 32 whenever the target 24 has been successfully read. The window 26 not only prevents any stray aiming and/or illuminating light from leaking to the light scattering section 80 and erroneously indicating that a target has been successfully read, but also prevents the visual indicating light from leaking to the interior compartments, and principally to the compartment 72 in which the imager 10 is contained.

The reader 30 may also be provided with an object sensing system for detecting entry of the target 24 into the field of view 20. The object sensing system includes an object sensing or wakeup light source for directing the emitted light as an object sensing light at the target, and an object sensing or wakeup receiver to detect the return of the emitted light from the target 24. The window 26 also prevents any stray object sensing light from leaking to any of the interior compartments, and principally to the compartment 72 in which the imager 10 is contained.

The window 26 is either held removably against, or is fixedly and permanently mounted, for example, by an adhesive or other fasteners, to the chassis 70. When the window 26 is thus fixedly mounted, the module 40 is completely sealed and can be moved around a manufacturing facility, or even shipped to another facility, without worry of contamination by environmental contaminants. Advantageously, the window 26 is generally planar and is positioned to be generally parallel to the PCB 38. The window 26 may also be curved or formed with some other shape, in which the case, the outer chassis surfaces are configured with a complementary contour so that a tight seal is made when the window 26 contacts the chassis 70. Although the window 26 is shown as contacting the chassis 70 at exterior chassis surfaces, it will be understood that the chassis 70 may also be recessed with a cavity in which the window 26 is mounted. A recessed window will be more resistant to scratches and contamination.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for reading a target by image capture, the imaging module comprising:
a chassis having first chassis walls bounding a first interior compartment having a first opening, the chassis walls terminating in outer wall surfaces of the chassis at the opening;
a light source supported within the chassis and outside the first interior compartment, the light source to emit light;
an imager contained in the first interior compartment, the imager to capture an image through the first opening over a field of view; and
a light-transmissive window positioned in direct contact with the outer wall surfaces of the chassis and covering the first opening, the window environmentally sealing, optically isolating, and resisting entry of the emitted light into, the first interior compartment.

2. The module of claim 1, further comprising second chassis walls bounding a second interior compartment having a second opening, wherein:
the light source is an aiming light source contained in the second interior compartment and mounted on a printed circuit board (PCB), the aiming light source to emit the light as an aiming light through the second opening; and
the first and second chassis walls extend away from the PCB in a direction generally perpendicular to the PCB.

3. The module of claim 1, further comprising second chassis walls bounding a second interior compartment having a second opening, wherein:
the light source is an illuminating light source contained in the second interior compartment and mounted on a printed circuit board (PCB), the illuminating light source to emit the light as an illuminating light through the second opening; and
the first and second chassis walls extend away from the PCB in a direction generally perpendicular to the PCB.

4. The module of claim 1, wherein the light source is an indicating light source to emit the light as a visual indicating light when the target has been successfully read.

5. The module of claim 1, wherein:
the light source is at least one of an aiming light source to generate an aiming light, and an illuminating light source to generate an illuminating light; and
the imager and the at least one of the aiming light source and the illuminating light source are mounted on a printed circuit board.

6. The module of claim 1, wherein the window is fixedly mounted on the chassis.

7. The module of claim 1, further comprising:
second chassis walls bounding a second interior compartment having a second opening, wherein the light source is a first light source contained in the second interior compartment and mounted on a generally planar printed circuit board (PCB); and
third chassis walls bounding a third interior compartment having a third opening; and
a second light source contained in the third interior compartment and mounted on the PCB, wherein the window is in direct, sealed contact with edges of the first, second and third chassis wall surfaces.

8. An imaging reader for reading a target by image capture, the reader comprising:
a housing having an interior; and
an imaging module mounted in the interior of the housing, the module including:
a chassis having first chassis walls bounding a first interior compartment having a first opening, the chassis walls terminating in outer wall surfaces;
a light source supported within the chassis and outside the first interior compartment;
an imager contained in the first interior compartment to capture an image through the first opening over a field of view; and
a light-transmissive window positioned in direct contact with the outer wall surfaces and covering the first opening, the window environmentally sealing, optically isolating, and resisting entry of the emitted light into, the first interior compartment.

9. The reader of claim 8, first comprising second chassis walls bounding a second interior compartment having a second opening, wherein:
the light source is an aiming light source contained in the second interior compartment and mounted on a printed circuit board (PCB), the aiming light source to generate an aiming light through the second opening; and the first and second chassis walls extend away from the PCB in a direction generally perpendicular to the PCB.

10. The reader of claim 8, further comprising second chassis walls bounding a second interior compartment having a second opening, wherein:

the light source is an illuminating light source contained in the second interior compartment and mounted on a printed circuit board (PCB), the illuminating light source to generate an illuminating light through the second opening; and the first and second chassis walls extend away from the PCB in a direction generally perpendicular to the PCB.

11. The reader of claim 8, wherein the light source is an indicating light source to generate a visual indicating light when the target has been successfully read.

12. The reader of claim 8, wherein:

the light source is at least one of an aiming light source to generate an aiming light and an illuminating light source to generate an illuminating light; and the imager and the at least one of the aiming light source and the illuminating light source are mounted on a printed circuit board.

13. The reader of claim 8, wherein the window is fixedly mounted on the chassis and is environmentally sealed with the housing.

14. The reader of claim 8, further comprising:

second chassis walls bounding a second interior compartment having a second opening, wherein the light source is a first light source contained in the second interior compartment and mounted on a printed circuit board (PCB);

third chassis walls bounding a third interior compartment having a third opening;

a second light source contained in the third interior compartment and mounted to the PCB, wherein the window is in direct, sealed contact with edges of the first, second and third chassis wall surfaces.

15. A method comprising:

configuring a chassis with first chassis walls bounding a first interior compartment having a first opening;

configuring the chassis walls to terminate at outer wall surfaces at the first opening;

mounting a light source outside the first interior compartment, the light source to emit light;

mounting an imager within the first interior compartment such that the imager captures an image through the first opening over a field of view; and environmentally sealing, optically isolating, and resisting entry of the emitted light into, the first interior compartment by positioning a light-transmissive window in direct contact with the outer wall surfaces and in a covering relationship with the first opening.

16. The method of claim 15, further comprising configuring the chassis with second chassis walls bounding a second interior compartment having a second opening wherein mounting the light source comprises mounting the light source within the second interior compartment such that the light source emits light through the second opening; and configuring the first and second chassis walls to extend away from a printer circuit board (PCB).

17. The method of claim 15, further comprising configuring the light source as an indicating light source for directing the emitted light as a visual indicating light when a target has been successfully read.

18. The method of claim 15, further comprising configuring the light source as at least one of an aiming light source for directing the emitted light as an aiming light, and an illuminating light source for directing an illuminating light; and mounting the imager and the at least one of the light source and the illuminating light source on a printed circuit board.

19. The method of claim 15, wherein positioning the window in direct contact with the outer wall surfaces comprises fixedly mounting the window on the chassis.

\* \* \* \* \*